(12) United States Patent
Slivkins et al.

(10) Patent No.: US 11,182,280 B2
(45) Date of Patent: Nov. 23, 2021

(54) APPLICATION TESTING

(71) Applicant: Microsoft Technology Licensing, LLC, Redmond, WA (US)

(72) Inventors: Aleksandrs Slivkins, Arlington, VA (US); John Langford, Scarsdale, NY (US); Markus Cozowicz, New York, NY (US); Alekh Agarwal, New York, NY (US); Siddhartha Sen, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 660 days.

(21) Appl. No.: 15/839,281

(22) Filed: Dec. 12, 2017

(65) Prior Publication Data

US 2018/0101473 A1    Apr. 12, 2018

Related U.S. Application Data

(63) Continuation-in-part of application No. 14/513,012, filed on Oct. 13, 2014, now Pat. No. 10,284,664.

(51) Int. Cl.
*G06F 11/36* (2006.01)
*G06F 11/34* (2006.01)
(Continued)

(52) U.S. Cl.
CPC ........... *G06F 11/3692* (2013.01); *G06F 8/38* (2013.01); *G06F 9/451* (2018.02);
(Continued)

(58) Field of Classification Search
CPC .................................................. G06F 11/3692
(Continued)

(56) References Cited

U.S. PATENT DOCUMENTS 7,275,096 B2     9/2007  Green
7,653,893 B2 *   1/2010  Neumann ................ G06F 8/71
                                                 713/100

(Continued)

OTHER PUBLICATIONS

M. Amoui, M. Salehie, S. Mirarab and L. Tahvildari, "Adaptive Action Selection in Autonomic Software Using Reinforcement Learning," Fourth International Conference on Autonomic and Autonomous Systems (ICAS'08), Gosier, 2008, pp. 175-181, doi: 10.1109/ICAS.2008.35. (Year: 2008).*

(Continued)

*Primary Examiner* — James D. Rutten
(74) *Attorney, Agent, or Firm* — International IP Law Group, PLLC

(57) ABSTRACT

The claimed subject matter includes techniques for providing an application testing service with a user interface that enables a user to evaluate performance data for computer implemented decision policies. An example method includes displaying a first reward statistic comprising an actual performance result for a policy implemented by an application. The method also includes obtaining experimental data corresponding to previously implemented policies, computing a second reward statistic for a hypothetical policy using a reward function applied to the experimental data. The method also includes displaying the second reward statistic together with the first reward statistic to enable a user to compare the first reward statistic and the second first reward statistic.

22 Claims, 8 Drawing Sheets

(51) Int. Cl.
*G06F 8/38* (2018.01)
*G06T 11/20* (2006.01)
*G06F 9/451* (2018.01)
*G06N 20/00* (2019.01)
*H04L 29/08* (2006.01)
*G06Q 30/02* (2012.01)

(52) U.S. Cl.
CPC ...... *G06F 11/3438* (2013.01); *G06F 11/3476* (2013.01); *G06F 11/3664* (2013.01); *G06N 20/00* (2019.01); *G06Q 30/0201* (2013.01); *G06Q 30/0202* (2013.01); *G06Q 30/0242* (2013.01); *G06Q 30/0243* (2013.01); *G06Q 30/0244* (2013.01); *G06T 11/206* (2013.01); *H04L 67/22* (2013.01); *H04L 67/34* (2013.01); *G06T 2200/24* (2013.01); *H04L 67/02* (2013.01)

(58) Field of Classification Search
USPC .......................................................... 717/124
See application file for complete search history.

(56) References Cited

U.S. PATENT DOCUMENTS

| | | | |
|---|---|---|---|
| 8,244,559 B2 | 8/2012 | Horvitz et al. | |
| 8,606,608 B2 | 12/2013 | Bottou et al. | |
| 8,650,084 B2 | 2/2014 | Athey et al. | |
| 8,849,730 B2 | 9/2014 | Winn et al. | |
| 8,918,834 B1* | 12/2014 | Samuelsson | H04L 63/20 726/1 |
| 8,949,795 B2 | 2/2015 | Chandra et al. | |
| 2003/0101255 A1 | 5/2003 | Green | |
| 2005/0001837 A1* | 1/2005 | Shannon | G06T 11/206 345/440 |
| 2006/0123389 A1* | 6/2006 | Kolawa | G06F 11/3616 717/101 |
| 2006/0129892 A1 | 6/2006 | Diaconu et al. | |
| 2006/0206337 A1* | 9/2006 | Paek | G10L 15/065 704/275 |
| 2007/0203871 A1* | 8/2007 | Tesauro | G06N 3/006 706/53 |
| 2008/0313116 A1* | 12/2008 | Groble | G06N 7/005 706/45 |
| 2009/0037881 A1 | 2/2009 | Christy et al. | |
| 2012/0066665 A1 | 3/2012 | Kunze | |
| 2013/0019015 A1 | 1/2013 | Devarakonda et al. | |
| 2013/0077850 A1* | 3/2013 | Hirai | G06T 7/0004 382/149 |
| 2013/0111445 A1 | 5/2013 | Jones | |
| 2013/0117731 A1 | 5/2013 | Lesuer et al. | |
| 2013/0132774 A1 | 5/2013 | Somendra | |
| 2013/0159220 A1 | 6/2013 | Winn et al. | |
| 2013/0254384 A1 | 9/2013 | Wray | |
| 2013/0318023 A1* | 11/2013 | Morimura | G06N 20/00 706/46 |
| 2014/0026122 A1 | 1/2014 | Markande et al. | |
| 2014/0059522 A1 | 2/2014 | Chandra et al. | |
| 2014/0156383 A1 | 6/2014 | Vijayaraghavan et al. | |
| 2014/0335480 A1 | 11/2014 | Asenjo et al. | |
| 2015/0220999 A1* | 8/2015 | Thornton | H04M 15/8011 705/14.66 |
| 2015/0324275 A1 | 11/2015 | Luan et al. | |
| 2016/0040603 A1* | 2/2016 | Dull | G05B 13/0265 700/49 |
| 2016/0078146 A1 | 3/2016 | Simpson et al. | |
| 2016/0105351 A1 | 4/2016 | Slivkins et al. | |
| 2016/0139914 A1 | 5/2016 | Levi et al. | |
| 2016/0147645 A1 | 5/2016 | Kandpal | |
| 2017/0364829 A1* | 12/2017 | Fyffe | G06F 30/20 |
| 2018/0012159 A1* | 1/2018 | Kozloski | G06Q 10/063116 |
| 2018/0314925 A1* | 11/2018 | Gauci | G06N 3/0445 |

OTHER PUBLICATIONS

Walker, M. A. (2000). An application of reinforcement learning to dialogue strategy selection in a spoken dialogue system for email. Journal of Artificial Intelligence Research, 12, 387-416. (Year: 2000).*
"Amazon Machine Learning—Artificial Intelligence on AWS", Retrieved From << https://aws.amazon.com/machine-learning/>>. Retrieved On: Nov. 20, 2017, 9 Pages.
"Azure Machine Learning Studio", Retrieved From <<https://azure.microsoft.com/en-US/services/machine-learning-studio/>>. Retrieved On: Nov. 20, 2017, 8 Pages.
"Blob Storage", Retrieved From <<https://azure.microsoft.com/en-US/services/storage/blobs/>>, Retrieved On: Nov. 20, 2017, 7 Pages.
"Data Factory", Retrieved From <<https://azure.microsoft.com/en-US/services/data-factory/>>, Retrieved On: Nov. 20, 2017, 7 Pages.
"Event Hubs", Retrieved From <<https://azure.microsoft.com/en-US/services/event-hubs/>>, Retrieved On: Nov. 20, 2017, 7 Pages.
"Language Understanding Intelligent Service (LUIS).", Retrieved From << https://www.luis.ai/home>>, Retrieved On: Nov. 20, 2017, 4 Pages.
"Microsoft Power BI", Retrieved From << https://powerbi.microsoft.com/en-US/>>, Retrieved On: Nov. 20, 2017, 12 Pages.
"Mixpanel: Mobile Analytics", Retrieved From << https://mixpanel.com/>>, Retrieved On: Nov. 20, 2017, 5 Pages.
"Multiworld Testing Decision Service", Retrieved From << http://aka.ms/mwt>>, Retrieved On: Nov. 20, 2017, 3 Pages.
"MWT Decision Service Wiki", Retrieved From << https://github.com/Microsoft/mwt-ds/wiki/>>, Sep. 13, 2016, 1 Page.
"Optimizely", Retrieved From << https://www.optimizely.com/, Retrieved On: Nov. 20, 2017, 8 Pages.
"Redis Cluster Specification", Retrieved From <<http://redis.io/topics/cluster-spec>>, Retrieved Date: Nov. 20, 2017, 37 Pages.
"SPARK MLlib", Retrieved From <<http://spark.apache.org/mllib >>, Retrieved On: Nov. 20, 2017, 4 Pages.
"Stream Analytics Query Language Reference", Retrieved From <<https://msdn.microsoft.com/en-us/ library/azure/dn834998.aspx?f=255&MSPPError=-2147217396>>, Sep. 29, 2015, 2 Pages.
"Table Storage: A NoSQL key-value store for rapid development using massive semi-structured datasets", Retrieved From << https://azure.microsoft.com/en-US/services/storage/tables/>>, Retrieved On: Nov. 20, 2017, 5 Pages.
"Web Apps: Create and deploy mission-critical web apps that scale with your business", Retrieved From << https://azure.microsoft.com/en-us/services/app-service/web/>>, Retrieved On: Nov. 20, 2017, 9 Pages.
"Yelp MOE (Metrics Optimization Engine)", Retrieved From << http://yelp.github.io/MOE/ >>, Retrieved On: Nov. 20, 2017, 13 Pages.
Agarwal, et al., "A reliable effective terascale linear learning system", In Journal of Machine Learning, vol. 15 Issue 1, Mar. 2014, pp. 1111-1133.
Agarwal, et al., "Contextual bandit learning under the realizability assumption", In Proceedings of Fifteenth International Conference on Artificial Intelligence and Statistics, Apr. 21, 2012, 9 pages.
Agarwal, et al., "Making Contextual Decisions with Low Technical Debt", Retrieved From <<https://arxiv.org/abs/1606.03966>>, pp. 1-14.
Agarwal, et al., "Personalizing LinkedIn Feed", In Proceedings of 21st ACM SIGKDD International Conference on Knowledge Discovery and Data Mining, Aug. 11, 2015, pp. 1651-1660.
Agarwal, et al., "Taming the monster: A fast and simple algorithm for contextual bandits", In Proceedings of the 31st International Conference on Machine Learning, Oct. 15, 2014, pp. 1-30.
Agarwal, et al., "Thompson Sampling for Contextual Bandits with Linear Payoffs", In Proceedings of the 30th International Conference on Machine Learning, vol. 28, Feb. 13, 2013, 9 Pages.
Auer, et al., "The non-stochastic multi-armed bandit problem", In SIAM Journal on Computing, vol. 32, Issue 1, 2002, pp. 48-77.
Auer, Peter, "Using Confidence Bounds for Exploitation-Exploration Trade-offs", In Proceedings of 41st Annual Symposium on Foundations of Computer Science, Nov. 2002, pp. 397-422.

(56) References Cited

OTHER PUBLICATIONS

Basoglu, et al., "Computational Network Toolkit", Retrieved From <<http://www.cntk.ai/>>, Jun. 1, 2017, 1 Page.

Beygelzimer, et al., "Agnostic Active Learning Without Constraints", In Proceedings of 23rd International Conference on Neural Information Processing Systems, vol. 1, Dec. 6, 2010, pp. 1-17.

Beygelzimer, et al., "Learning reductions that really work", In Proceedings of the IEEE, vol. 104, Issue 1, Jan. 2016, pp. 136-147.

Bottou, et al., "Counterfactual reasoning and learning systems: The example of computational advertising", In Journal of Machine Learning Research, vol. 14, Issue 1, Nov. 2013, pp. 3207-3260.

Bubeck, et al., "Regret Analysis of Stochastic and Nonstochastic Multi-armed Bandit Problems", In Proceedings of Foundations and Trends in Machine Learning, vol. 5, Issue 1, Dec. 12, 2012, 130 Pages.

Chu, et al., "Contextual Bandits with Linear Payoff Functions", In Proceedings of 14th International Conference on Artificial Intelligence and Statistics, Apr. 11, 2011, pp. 208-214.

Cozowicz, et al., "MWT Decision Service: GitHub repository", Retrieved From <<https://github.com/Microsoft/mwt-ds>>, Retrieved On: Nov. 20, 2017, 2 Pages.

Cozowicz, Markus, "Vowpal Wabbit (Fast Learning)", Retrieved From <<https://github.com/JohnLangford/vowpal_wabbit/wiki/Download>>, Jan. 19, 2017, 1 Page.

Dean, et al., "TensorFlow—An Open Source Software Library for Machine Learning", Retrieved From << https://www.tensorflow.org/ >>, Retrieved On: Nov. 20, 2017, 5 Pages.

Dudik, et al., "Efficient optimal learning for contextual bandits", In Proceedings of Twenty-Seventh Conference on Uncertainty in Artificial Intelligence, Jul. 14, 2011, 8 Pages.

Dudík, et al., "Doubly robust policy evaluation and learning", In Proceedings of 28th Conference on Machine Learnings, Mar. 23, 2011, 8 Pages.

Dudík, et al., "Sample-efficient nonstationary policy evaluation for contextual bandits", In Proceedings of 28th Conference on Uncertainty in Artificial Intelligence, Oct. 16, 2012, 11 Pages.

Hanneke, Steve, "Theory of disagreement-based active learning", In Journal of Foundations and Trends in Machine Learning, vol. 7, No. 2-3, Jun. 12, 2014.

Hofmann, et al., "Online evaluation for information retrieval", In Journal of Foundations and Trends Information Retrieval, vol. 10, No. 1, Jun. 22, 2016, pp. 1-117.

Jamieson, et al., "Next: A system for real-world development, evaluation, and application of active learning", In Proceedings of Advances in Neural Information Processing Systems, Dec. 7, 2015, pp. 1-17.

Crankshaw, et al., "The missing piece in complex analytics: Low latency, scalable model management and serving with velox". In Proceedings of Seventh Biennial Conference on Innovative Data Systems Research, Jan. 4, 2015, 7 Pages.

Kohavi, et al., "Controlled ex-periments on the web: survey and practical guide", In Journal of Data Mining and Knowledge Discovery, vol. 18 Issue 1, Feb. 2009, pp. 1-31.

Kohavi, et al., "Online controlled experiments and a/b tests", In Proceedings of Encyclopedia of Machine Learning and Data Mining, Aug. 10, 2015, pp. 1-11.

Krishnamurthy, et al., "Efficient contextual semi-bandit learning", In Journal of Computing Research Repository, Feb. 2015, pp. 1-29.

Langford, et al., "The Epoch-Greedy Algorithm for Contextual Multi-armed Bandits", In Proceedings of 20th International Conference on Neural Information Processing Systems, Dec. 3, 2007, pp. 1-8.

Li, et al., "A contextual-bandit approach to personalized news article recommendation", In Proceedings of 19th International conference on World wide web, Apr. 26, 2010, pp. 661-670.

Li, et al., "Scaling distributed machine learning with the parameter server", In Proceedings of 11th USENIX Conference on Operating Systems Design and Implementation, Oct. 6, 2014, pp. 583-598.

Vuduc, et al., "Improving Distributed Memory Applications Testing By Message Perturbation", In Proceedings of 2006 Workshop on Parallel and Distributed Systems: Testing and Debugging, Jul. 17, 2006, 9 Pages.

Sutton, et al., "Reinforcement Learning: An Introduction", In publications of MIT Press, Mar. 1, 1998, 10 Pages.

Thompson, William R., "On the Likelihood that One Unknown Probability Exceeds Another in View of the Evidence of Two Samples", In the Book Biometrika, Published by Oxford University Press, vol. 25, No. 3/4, Dec. 1, 1933, pp. 285-294, Abstract only available, pp. 2.

"Notice of Allowance Issued in U.S. Appl. No. 14/513,012", dated Sep. 11, 2018, 10 Pages.

Dotan, et al., "Debugging and Testing Behavioral UML Models", In the Companion to the 22nd ACM SIGPLAN Conference on Object-oriented Programming Systems and Applications Companion, Oct. 21, 2007, pp. 838-839.

Elbaum, et al., "An Empirical Study of Profiling Strategies for Released Software and their Impact on Testing Activities", In Proceedings of the ACM SIGSOFT International Symposium on Software Testing and Analysis, 2004, pp. 65-75.

Gerber, et al., "Field Experiments: Design, Analysis, and Interpretation", In the book RAE, Published by W.W. Morton & Co, Inc., 8th Edition, Nov. 2, 2012, 3 Pages.

Gittins, et al., "Multi-Armed Bandit Allocation Indices", Published by John Wiley & Sons, Feb. 16, 2011, 15 Pages.

Jensen, et al., "Meminsight Platform-Independent Memory Debugging for JavaScript", Retrieved from: https://manu.sridharan.net/files/FSE15MemInsight.pdf, 2015, pp. 345-356.

Jiang, et al., "Profile-Guided Program Simplification for Effective Testing and Analysis", Retrieved from: http://www.mysmu.edu/faculty/lxjiang/papers/fse08slides.pdf, 2008, pp. 48-58.

Johnson, Mark, "Some Requirements for Architectural Support of Software Debugging", In Proceedings of the first International Symposium on Architectural Support for Programming Languages and Operating Systems,Mar. 1, 1982, pp. 140-148.

Schurman, et al., "The User and Business Impact of Server Delays, Additional Bytes, and HTTP Chunking in Web Search", Retrieved From: https://conferences.oreilly.com/velocity/velocity2009/public/schedule/detail/8523, Jul. 23, 2009, 4 Pages.

Li, et al., "Unbiased offline evaluation of contextual-bandit-based news article recommendation algorithms", In Proceedings of the fourth ACM international conference on Web search and data mining, Feb. 9, 2011, pp. 297-306.

Lu, et al., "Showing Relevant Ads via Lipschitz Context Multi-Armed Bandits", In 14th International Conference on Artificial Intelligence and Statistics, May 13, 2010, pp. 1-17.

Ortner, Mathias, "Google Cloud Machine Learning", Retrieved From << https://cloud.google.com/ml-engine/>>, Retrieved On: Nov. 20, 2017, 9 Pages.

Popel, Martin, "Cost Sensitive One Against All (csoaa) multi class example", Retrieved From <<https://github.com/JohnLangford/vowpal_wabbit/wiki/Cost-Sensitive-One-Against-All-(csoaa)-multi-class-example>>, Jul. 19, 2017, 3 Pages.

Ronan, et al., "Torch: A scientific computing framework for LuaJIT", Retrieved From <<http://torch.ch/>>. Retrieved On: Nov. 20, 2017, 1 Page.

"Microsoft Azure: Cloud Computing Platform & Services", Retrieved From << https://azure.microsoft.com/en-US/>>, Retrieved On: Nov. 20, 2017, 13 Pages.

Simard, et al., "Ice: enabling non-experts to build models interactively for large-scale lopsided problems", Retrieved From <<https://arxiv.org/pdf/1409.4814>>, Sep. 16, 2014, 10 Pages.

Slivkins, Aleksandrs, "Contextual bandits with similarity information", In Journal of Machine Learning Research, vol. 15, Issue 1, Jul. 2014, pp. 2533-2568.

"Azure Stream Analytics", Retrieved From << https://azure.microsoft.com/en-US/services/stream-analytics/ >>, Retrieved On: Nov. 20, 2017, 8 Pages.

Swaminathan, et al., "Off-policy evaluation for slate recommendation", In Journal of Computing Research Repository, May 16, 2016, pp. 1-23.

(56) References Cited

OTHER PUBLICATIONS

Szepesvari, Csaba, "Algorithms for Reinforcement Learning", In Publications of Morgan and Claypool Publishers, vol. 4, No. 1, Jun. 2009, pp. 1-98.

Author Unknown, "Amazon EC2", Published on: Dec. 7, 2006, 5 pages. Available at: http://aws.amazon.com/ec2/.

Vallo, Mia, "Google Analytics", Retrieved From << http://www.google.com/analytics >>, Retrieved On: Nov. 20, 2017, 12 Pages.

Wang, et al., "Minerva: A scalable and highly efficient training platform for deep learning", In Proceedings of NIPS Workshop, Distributed Machine Learning and Matrix Computations, 2014, pp. 1-9.

Zaharia, et al., "Spark: Cluster computing with working sets", In Proceedings of 2nd USENIX Conference on Hot Topics in Cloud Computing, Jun. 22, 2010, pp. 1-7.

Samimia, et al., "A combinatorial double auction resource allocation model in cloud computing", In Proceedings of Information Sciences, Feb. 13, 2014, 2 pages.

Zhang, et al., "ABACUS: An Auction-Based Approach to Cloud Service Differentiation", In IEEE International Conference on Cloud Engineering, Mar. 25, 2013, pp. 292-301.

Non-Final Office Action, issued in U.S. Appl. No. 14/513,012, dated Jun. 29, 2017, 23 pages.

Final Office Action, issued in U.S. Appl. No. 14/513,012, dated Nov. 14, 2017, 25 pages.

"D3.js: Data Driven Documents", Retrieved From: https://d3js.org/, 4 Pages.

"Non-Final Office Action Issued in U.S. Appl. No. 14/513,012", dated Mar. 27, 2018, 31 Pages.

* cited by examiner

APPLICATION TESTING

CROSS-REFERENCE TO RELATED APPLICATION

This application is a continuation-in-part of U.S. patent application Ser. No. 14/513,012, filed Oct. 13, 2014, and titled "Application Testing", the application of which is incorporated herein in its entirety by reference.

BACKGROUND

Software applications are often configured to provide a customized user experience. For example, a website application may receive information related to the context of a user interaction with a webpage, such as time of day, the age of the user, or the geographical locations of the user, among others. Based on this information, the website may provide a different user experience. For example, a news website may provide different new articles to be displayed to the user based on the user's age, the time of the visit, or the user's geographical location. The rule used to associate the contextual information with the selected content may be referred to as a policy. To identify effective policies, the operator of a Website application can test a variety of policies. Traditional application testing tends to be a slow and expensive process.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An embodiment provides a method for training computer-implemented decision policies and enabling a user to evaluate the effectiveness of hypothetical decision policies. The method includes displaying a first reward statistic comprising an actual performance result for a policy implemented by an application. The method also includes obtaining experimental data corresponding to previously implemented policies, and computing a second reward statistic for a hypothetical policy using a reward function applied to the experimental data. The method also includes displaying the second reward statistic together with the first reward statistic to enable a user to compare the first reward statistic and the second first reward statistic.

Another embodiment provides a system for training computer-implemented decision policies and generating user interface that enables a user to evaluate the effectiveness of the hypothetical decision policies. The system includes a display device, a processor, and a system memory comprising code to direct the actions of a processor. The code directs the processor to display, on the display device, a first reward statistic comprising an actual performance result for a policy implemented by an application. The code also directs the processor to obtain experimental data corresponding to previously implemented policies, and compute a second reward statistic for a hypothetical policy using a reward function applied to the experimental data. The code also directs the processor display, on the display device, the second reward statistic together with the first reward statistic to enable a user to compare the first reward statistic and the second first reward statistic.

Another embodiment provides one or more computer-readable memory storage devices for storing computer-readable instructions. When executed, the computer-readable instructions instruct one or more processing devices to display a first reward statistic comprising an actual performance result for a policy implemented by an application. The computer-readable instructions also instruct the one or more processing devices to obtain experimental data corresponding to previously implemented policies, and compute a second reward statistic for a hypothetical policy using a reward function applied to the experimental data. The computer-readable instructions also instruct the one or more processing devices to display the second reward statistic together with the first reward statistic to enable a user to compare the first reward statistic and the second first reward statistic.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 8:
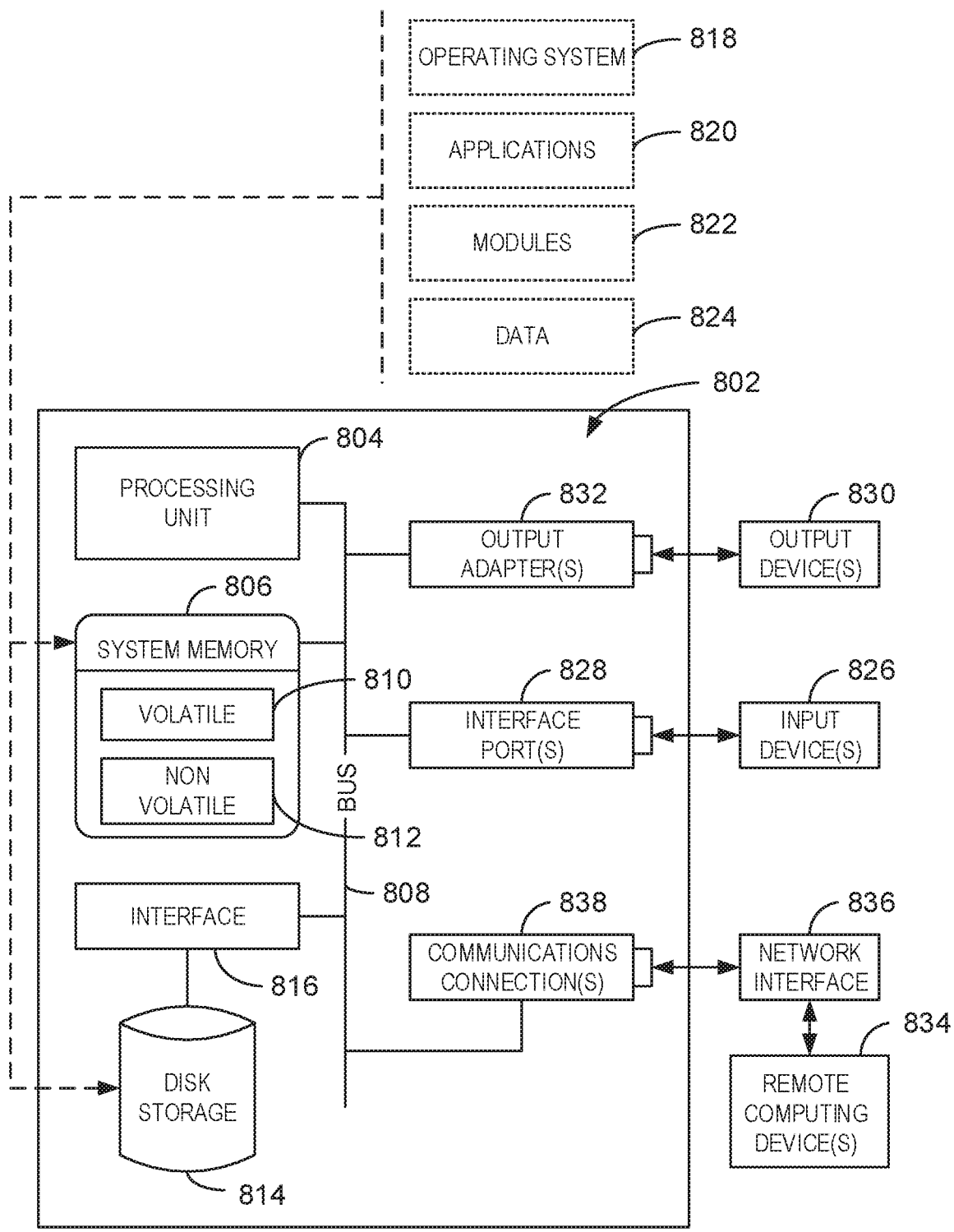
FIG. 8 is a block diagram of an exemplary computing device configured for implementing various aspects of the techniques described herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some implementations, various components reflect the use of corresponding components in an actual implementation. In other implementations, any single component illustrated in the figures may be implemented by a number of actual components. The depiction of any two or more separate components in the figures may reflect different functions performed by a single actual component. FIG. 8, discussed below, provides details regarding one computing device that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals and the like.

The following describes example implementations of techniques for testing an application. To test an application, features of the application can be varied and the users' interactions with the application can be evaluated to determine which variation of a feature provided the better outcome according to a specified metric. The parameters of such tests are usually specified by humans on an ad hoc basis that is specific to a particular application under test. Implementations of the present techniques provide an application testing service that can be used with a wide variety of applications and can be implemented, for example, as a cloud computing service. The application testing system described herein enables the testing of a broad range of applications using a single, generalized system that can be applied to many testing scenarios. The application testing system also provides efficient data collection techniques that can be used by client to evaluate the effectiveness of policies used by their applications. The application testing service provides decision making capabilities regarding variable features of the application under test. The application testing service can also collect data relating to the user interactions with the application under test under each feature variation. The data can be stored as a collection of test data that can be evaluated offline. Evaluation of the test data can reveal which variations of the application provided the better outcome. A system for implementing the application testing service can also include a Graphical User Interface (GUI), referred to herein as a "dashboard," that provides an intuitive and user-friendly interface for evaluating hypothetical policies and deploying policies manually selected by the client.

Figure 1:
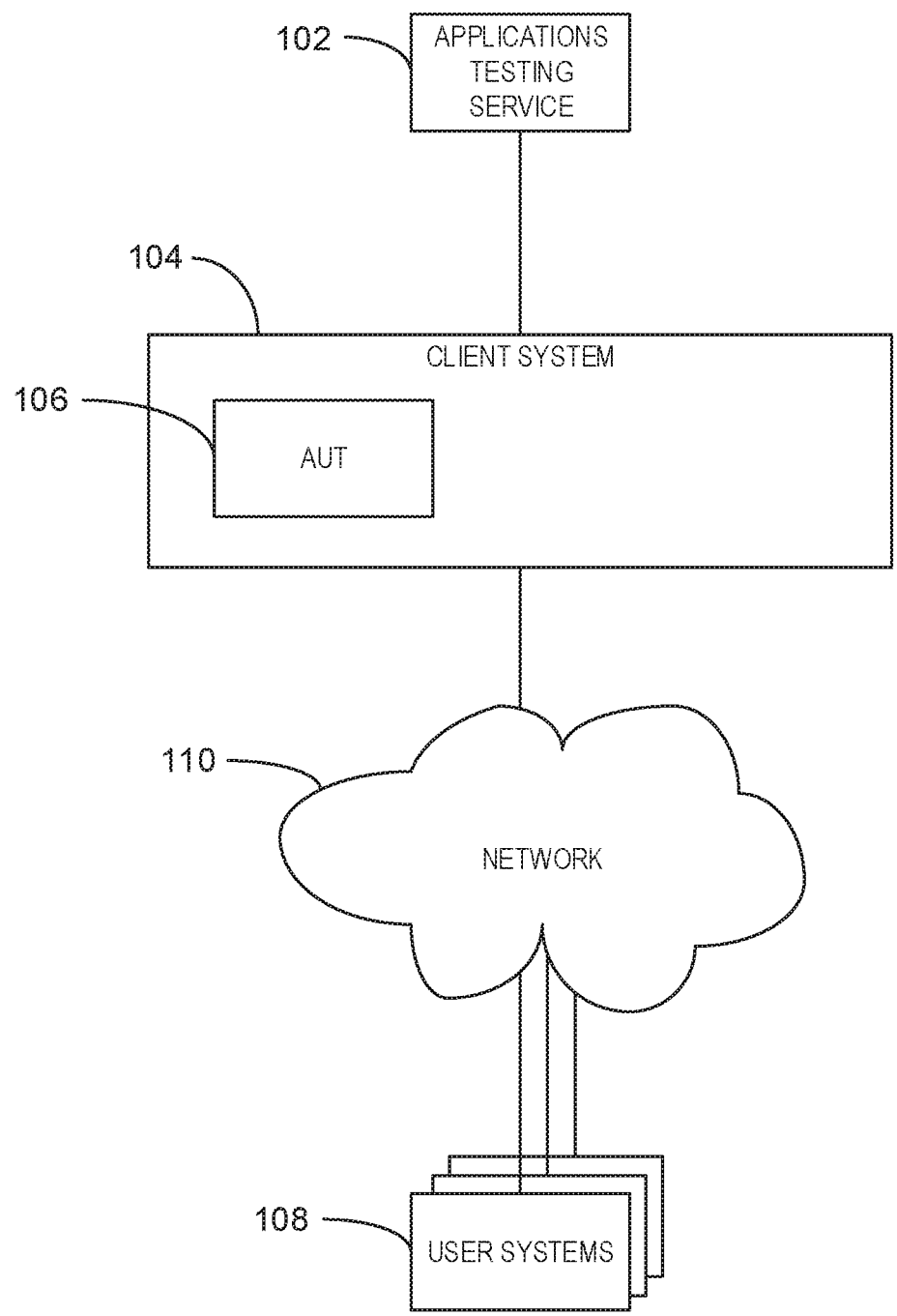
FIG. 1 is a block diagram of an example computer system for testing an application according to implementations described herein.

FIG. 1 is a block diagram of an example computer system for testing an application according to implementations described herein. The example computer system shown in FIG. 1 includes an application testing service 102 and a client system 104. For the sake of clarity, the term "client" is used herein to refer to the entity that owns or has control over the application being tested, and the term "user" is used herein to refer to a user of the application being tested. For example, in some instances, the client may be the owner of a Website and the user may be a visitor to the Website.

The client system 104 can be coupled to the application testing service 102 through any suitable type of network, including a local area network (LAN), a Wide Area Network (WAN), or the Internet, for example. The client system 104 includes an Application Under Test (AUT) 106, which is the application that is being testing using the application testing service 102. The AUT 106 can be substantially any type of application, including a dynamic Web page with configurable layout, a cloud computing service, or a search engine, ad exchange, a Website with customizable content such as a news Website, an operating system interface, a computer game, an online multiplayer gaming environment, a web platform for a crowdsourcing market, or a recommendation system such as system that recommend movies, books or other items, and others. The AUT 106 may also be a component or subsystem of an application such as a user interface.

The AUT 106 can be accessed by a number of user systems 108 through a network 110, which may be any suitable type of network, including a LAN, WAN, or the Internet, for example. The user systems 108 can include any suitable type of electronic device, including personal computers, laptops, smart phones, tablets, and the like.

During normal operation of the AUT 106, the behavior of the AUT 106 can be varied according to one or more policies, which are rules for selecting an action to be performed by the AUT 106 based on context information that describes some aspect of the user interaction with the AUT 106. Examples of context information include information about the age of the user, the geographical location of the user, the user's gender, the time at which a user interaction is taking place, the type of device that the user is using to access the AUT 106, and any other type of information that may pertain to the user interaction with the AUT 106. Actions that may be identified based on the policy can include things such as the displaying of advertisements, search results, news articles, and products available for purchase, among others. Policies can be specified by the client and may be designed and implemented to provide a better user experience or to improve some aspect of the AUT 106. For example, if the AUT 106 displays a list of news articles, the news articles may be selected according to a policy that selects particular news articles based on the age and/or gender of the user. In this way, the user may be more likely to be presented with choices that are appealing to the user.

The application testing service 102 can be used to determine the effectiveness of various hypothetical policies that could be implemented by the AUT 106. The client system 104 can include one or more application programming interfaces (APIs) that enable the AUT 106 to communicate with the application testing service 102 during testing. During testing, rather than use actual policies, actions can be selected for the purpose of gathering data that can later be analyzed to identify effective policies. The AUT 106 can be tested during normal user interactions. The testing involves data gathering operations that are performed by the application testing service 102 according to specifications provided by the client. Various user interactions with the AUT 106 can trigger data gathering operations. Examples of user interactions include initiating an initial access of the AUT 106, initiating a search, clicking on a link, selecting an option, entering text in a textbox, purchasing a product or service, visiting an advertiser, among others. The gathered data can be used later by the client to evaluate policies that may be employed by the AUT 106.

When a user interacts with the AUT 106, the AUT 106 may obtain context information regarding the interaction. The type of context information to be gathered can be specified by the client. Some types of context information may be received from the user system 108, while other types of context information may be determined by the AUT 106. For example, the user may be prompted by the AUT 106 to provide login information, which may be used by the AUT 106 to obtain previously stored information about the user. Some context information may be received from cookies stored on the user system 108. The AUT 106 may be configured to enable the user to decide whether data can be collected (opt-in or opt-out) about the user or the user's interaction with the AUT 106. The AUT 106 may be configured such that the user is asked to provide consent before data about the user or the user's interaction with the AUT 106 can be collected.

For certain user interactions with the AUT 106, the application testing service 102 can make a decision regarding various possible actions of the AUT 106. In some examples, the client determines the set of actions that are available and the application testing service 102 selects one or a subset of the actions from the set and informs the AUT 106 of its decision. After the chosen action or subset of actions has been presented to the user, the user's further interaction with the AUT 106 can be used to determine reward data that can be used to evaluate the effectiveness of the chosen action. The reward data may also be referred to herein as the outcome. The outcome is a set of one or more parameters that describes the user's response to the selected action or subset of actions. For example, if the decision was a decision regarding which product to display, the outcome may include an indication of whether the user clicked on the link corresponding with the product, added the product to a shopping cart, completed a purchase of the product, or some combination thereof. If the decision was in regard to the selection of a news article, the outcome could include an indication of whether the user clicked the link, how long the user stayed at the linked news article, or some combination thereof. The outcome may include various other types of information indicating how a user responded to the selected action or actions. The reward data, or outcome, is used to compute a reward statistic. The reward statistic is a parameter computed using a reward function applied to one or more of the outcome parameters. The reward statistic is used to indicate the relative success of the chosen action.

The application testing service 102 can log the data corresponding to the user interactions, including the context information, the chosen action, and the reward data. The logged data can then be evaluated by the client to identify effective policies. The application testing service 102 can retrieve log information related to a hypothetical policy and return various statistical information based on the data. The statistical data can be used by the client to identify a policy or set of policies that produce desired results. The effectiveness of a policy can determined based on a reward function that may be specified by the client. For example, if the policy relates to determining which news articles to display, the reward function may direct the application testing service 102 to compute the percentage of people who linked to one of the news articles. In this way, the application testing service 102 can be used to evaluate various policies to determine which policies are more effective. The application testing service 102 is configured to be used with substantially any AUT 106 based on specifications provided by the client.

Figure 2:
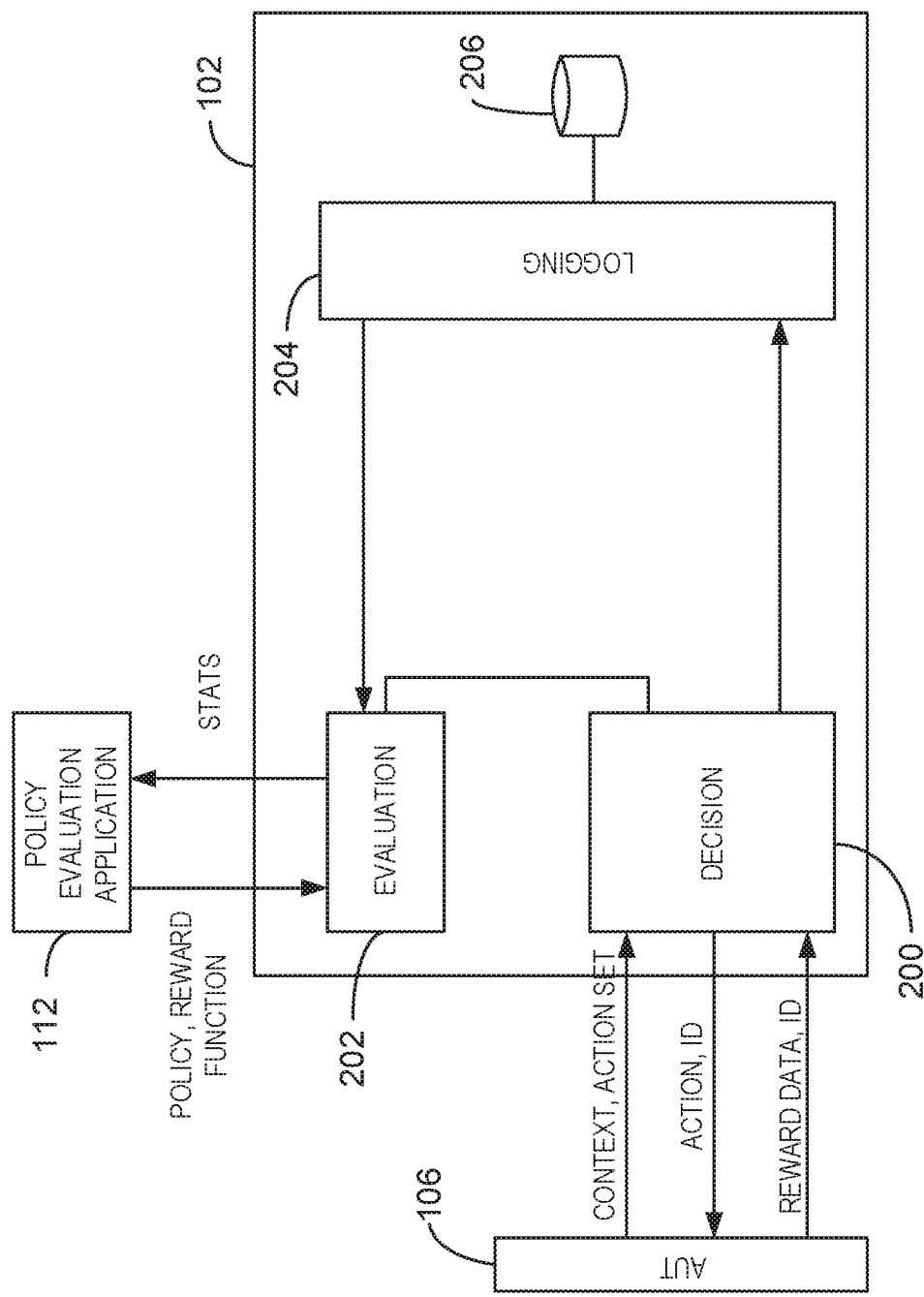
FIG. 2 is a block diagram of an example application testing service according to implementations described herein.

FIG. 2 is a block diagram of an example application testing service 102 according to implementations described herein. Each of the components shown in FIG. 2 can be implemented using a combination of hardware and software. The example architecture shown in FIG. 2 is just one example of an architecture that can be used to implement the techniques described herein.

As shown in FIG. 2, the application testing service 102 can include a decision module 200, an evaluation module 202, and a data logging module 204. The decision module 200 uses a decision algorithm to determine an action of the AUT 106 based on information provided by the AUT 106 and the selected policy. Each policy is a deterministic mapping from contexts (e.g., user features) to actions (e.g., which article to show to a user). The decision algorithm determines the action of the AUT 106 using a set of different policies so as to collect new and useful data while not degrading performance of the AUT 106. The policies used by the decision algorithm may include one or more default policies (policies already used in the production system or learned by the application testing service 102 from collected data). The decision algorithm typically inserts some randomization in the policy selection.

The AUT 106 can send a request to the decision module 200 to identify an action to present to a user. In some examples, the decision module 200 can be configured to implement a pre-specified policy for a certain percentage of actions while implementing a randomly selected policy for the remainder to obtain exploration data. Along with the request, the AUT 106 can send context information and an action set that specifies the actions that the decision module 200 can select from. The decision module 200 can use one of several algorithms to select the action, including fixed algorithms and dynamic algorithms, which are explained further below. The selected action is then reported to the AUT 106 and implemented by the AUT 106. Along with the action, the decision module 200 can also send a unique identifier that enables the decision module 200 to associate the action with the corresponding reward information. In some examples, the decision module 200 can send an ordered list of actions to the AUT 106. After implementing the action, the AUT 106 obtains reward data that corresponds to the behavior of the user in response to the action and reports the reward data to the decision module 200 along with the unique identifier. The decision module 200 sends the context information, selected action, and reward data to the data logging module 204, which stores the data to a data storage device 206.

The decision module 200 can implement various decision algorithms for selecting the action to be reported to the AUT 106. The specific decision algorithm used may be specified by the client through the AUT 106. For example, the decision module 200 may have a set of possible decision algorithms that can be selected by the AUT 106. The decision algorithms include fixed and adaptive decision algorithms. A fixed decision algorithm is an algorithm wherein decisions are made without regard to reward data received in connection with previous decisions. In some examples, the decision algorithm includes randomly selecting an action from the action set.

An adaptive decision algorithm is an algorithm wherein actions are selected based on information extracted through analysis of previous decisions and the reward data corresponding to those decisions. For example, if the reward data corresponding to a specific action indicates that the action is unlikely to elicit a useful response from the user, the decision algorithm can eliminate the action from the action set. The decision algorithm can then randomly select one of the remaining actions in the reduced action set. The determination of whether an action is likely to elicit a useful response can also take into account the context information. For example, the action set for the request may request the decision module 200 to select one or more movie choices to present to a user. Based on previous decisions and the corresponding reward data, it may be determined that people of a certain demographic are unlikely to purchase movies of a particular genre. In that case, the decision module 200 may adapt to the new information by eliminating movies of that genre from the actions set when the context information indicates that the user is within the relevant demographic.

To implement adaptive decision algorithms, the decision module 200 can communicate with the evaluation module 202. The application testing service 102 can analyze previous chosen actions to determine which actions may be likely to produce more useful data by comparing previously chosen actions and the context information associated with the previously chosen actions. The application testing service 102 can provide its findings to the decision module 200. For example, the application testing service 102 may instruct the decision module 200 to update the default policies and other parameters used by the decision algorithm. The decision module 200 can interact with the evaluation module 202 to determine the effectiveness of policies as new test data is collected and logged.

In both the fixed and adaptive decision algorithms, decisions can be randomized to provide an appropriate level of exploration over possible actions. In some examples, the randomization may be weighted in favor of certain actions. For example, if the reward data associated with a particular action indicates a high level of success at eliciting a useful user response, the action may be weighted more heavily by the decision module 200 in current decision.

During testing of the AUT 106, there is a chance that the experimental decisions provided by the decision module 200 will be much less effective than would otherwise be the case if a known policy were being implemented. Accordingly, testing of the AUT 106 could result in reduced application performance. The performance of the AUT 106 can be described by one or more statistical values that are computed based on the received reward data. The application testing service 102 can use the performance data to ensure that the performance of AUT 106 is not excessively degraded during the gathering of test data.

To ensure an acceptable level of performance, the AUT 106 can provide an exploration budget and a default policy to the application testing service 102. The exploration budget and default policy can be provided to the application testing service 102 when the AUT 106 initializes with the application testing service 102. The exploration budget may be a threshold value that corresponds with an acceptable level of performance reduction as measured by the reward data and acts as a safeguard against performance degradation due to exploration. The default policy is a policy specified by the client and is known to provide an acceptable level of performance, which may be specified by a default performance parameter. To determine whether the exploration budget has been exhausted, the exploration budget can be compared to the difference between the average performance of the system and the default performance parameter multiplied by the number of users.

As the decision module 200 executes, the application testing service 102 can compute one or more performance statistics, which are statistics that relate to the cumulative effectiveness of the selected actions as measured by the reward data reported by the AUT 106. The application testing service 102 can compare the computed performance statistics to the default performance value, and if the performance difference between the computed performance statistics and the default performance value exceeds the exploration budget, then the application testing service 102 can begin return decisions using the default policy rather than the decision algorithm. The application testing service 102 can continue updating the computed performance statistics during execution based on the reward data received for actions selected using the default policy. Once the difference between the computed performance statistics and the default performance value is under the exploration budget, the decision module 200 can the resume selecting actions based on the selection algorithm rather than the default policy.

In some cases, the AUT 106 may not have continuous access to the application testing service 102 during testing. To ensure that testing can take place even when the AUT 106 does not have access to the application testing service 102, the decision module 200 can be configured to support a disconnected mode. In disconnected mode, decisions are made locally on the client system 104 according to a current decision algorithm received from the application testing service 102. The current decision algorithm acts as a fixed decision algorithm during the time that the AUT 106 is disconnected from the application testing service 102. The current decision algorithm may be communicated from the decision module 200 to the AUT 106 during a time when the AUT 106 is connected. After each decision, the AUT 106 can temporarily log context information, decision information, and reward information to a data storage device of the client system 104. When connectivity is restored, the logged data can be communicated to the application testing service 102. If the AUT 106 is using an adaptive decision algorithm, the decision algorithm can be updated and pushed back to the client system 104 each time the AUT 106 reconnects with the application testing service 102.

The policy evaluation application 112 enables the client to evaluate the logged test data. The evaluation of the logged test data enables the client to identify effective policies to be used in the AUT 106. In some examples, the policy evaluation application 112 enables the client to define a hypothetical policy and receive statistical data related to the effectiveness of the hypothetical policy. A hypothetical policy refers to a policy that could be implemented in the AUT 106 and is being submitted to the policy evaluation application 112 to determine the results that would likely be obtained if the policy was actually implemented. To evaluate a hypothetical policy, the policy evaluation application 112 sends the hypothetical policy and a corresponding reward function to the evaluation module 202. The hypothetical policy may be a mapping of context information to specified actions. For example, if the policy is related to the selection of news articles, one mapping may specify that if the user is male, articles related to topic X should be selected, and another mapping may specify that if the user is female, articles of topic Y should be selected. Any suitable combination of context information can be used in the hypothetical policy. The reward function is a function that is used to compute a reward statistic based on the reward data that has been logged during application testing. For example, the reward function may instruct the evaluation module 202 to compute the percentage of instances in which the selected article was clicked on by the user.

Upon receiving the hypothetical policy and the reward function, the evaluation module 202 can access all of the logged test data relevant to the hypothetical policy. Information relevant to the hypothetical policy will be any log entry that contains data that matches the parameters of the hypothetical policy. The evaluation module 202 computes the reward statistic against the relevant data according to the reward function, and returns the reward statistic to the policy evaluation application 112. The client can provide a variety of hypothetical policies to determine which policy or set of policies may be more effective based on the returned reward statistic.

In some examples, the policy evaluation application 112 can send a group of hypothetical policies and a corresponding reward function to the evaluation module 202. The evaluation module 202 can evaluate each hypothetical policy in the group of hypothetical policies to determine the relative effectiveness of the hypothetical policies based on the reward statistics computed for each hypothetical policy. In some examples, the evaluation module 202 can return one or more hypothetical policies that have a higher effectiveness, for example, the most effective policy, the top two most effective policies, and so on.

Figure 3:
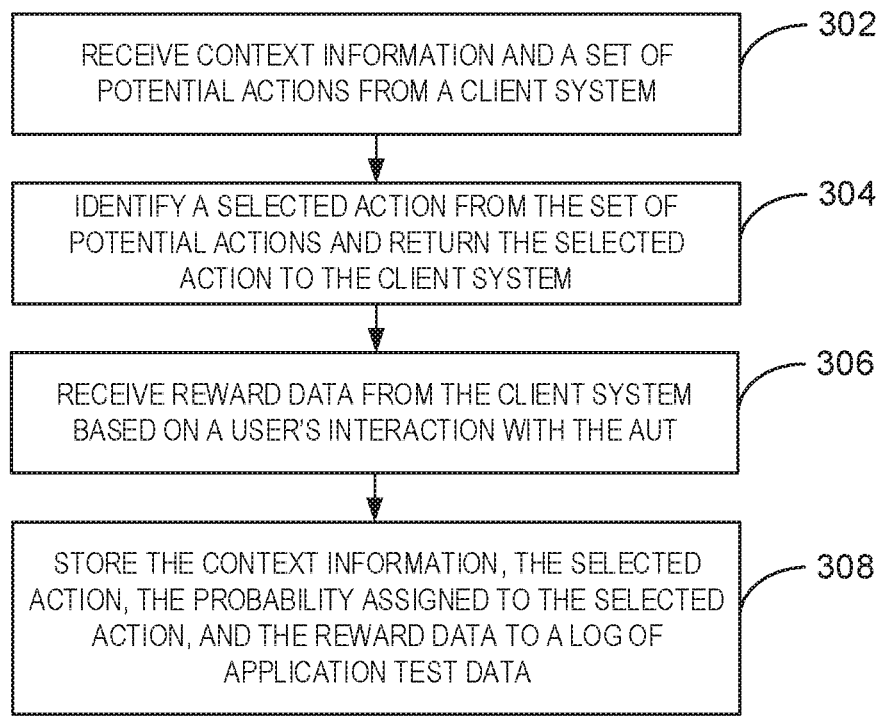
FIG. 3 is a process flow diagram summarizing a method of generating test data for an application according to implementations described herein.

FIG. 3 is a process flow diagram summarizing a method of generating test data for an application according to implementations described herein. One or more components of hardware or software of the computing device 800, may be configured to perform the method 300. In some implementations, various aspects of the method may be performed in a cloud computing device. The method 300 may begin at block 302.

At block 302, the application testing system receives context information and an action set from a client system. In some examples, the application testing system computes a probability distribution, D, for the action set based on previously logged test data. The probability distribution associates each action with a probability that describes the likelihood that the action will be selected by the user. The context information includes parameters that describe details of a user interaction with an AUT. The context information and action set are received as part of a request to select an action and may be received from the AUT executing on the client system. The action set is a set of potential actions that can be selected and presented to a user, such as which products, books, songs, or movie selection, or search results to present to the user, which advertisements or news articles to display, among others.

At block 304, the application testing system selects one or more of the actions from the action set to be presented to the user by the AUT. The application testing system can use fixed decision algorithms or adaptive decision algorithms to choose the selected action, including the example algorithms described herein and others not described. In some examples, the action is selected randomly according to the probability distribution, D. The selected action is sent to the AUT of the client system. The selected action will be used by the AUT to customize some feature of the AUT. For example, the action may instruct the AUT which products, books, songs, or movie selections to present to the user, which advertisements or news articles to display, among others. The application testing system may also provide a list of actions, which may be ranked according to the likelihood of eliciting a useful response from the user, such as list of products, movies, songs, and the like. The action or list of actions may be sent to the client system along with a unique identifier.

At block 306, reward data is received from the client system. The reward data is determined by the AUT based on the user's interaction with the customized AUT. The reward data may be a simple Boolean value that describes the user's reaction to the selected action. For example, the reward data may be an indication of whether the user clicked on a link corresponding to the selected action. In some examples, the reward data includes several values or a function that describes a more detailed set of outcomes. For example, if the action was the display of a product for purchase, the reward data may indicate whether a user clicked on a link to a product in addition to indicating whether the user actually purchased the product.

At block 308, the application testing system stores application testing data to a log. The application testing data can include the storing the context information, the selected action or actions, the probability of the selected action according to the probability distribution computed at block 302, and the reward data received from the client system. The testing data stored to the log can be retrieved through the client system to evaluate hypothetical policies. A method of providing application test data to the client system is described further in relation to FIG. 4. The testing data stored to the log can also be used by the application testing service to select future actions according to an adaptive decision algorithm.

This process flow diagram is not intended to indicate that the blocks of the method 300 are to be executed in any particular order, or that all of the blocks are to be included in every case. Further, any number of additional blocks not shown may be included within the method 300, depending on the details of the specific implementation.

Figure 4:
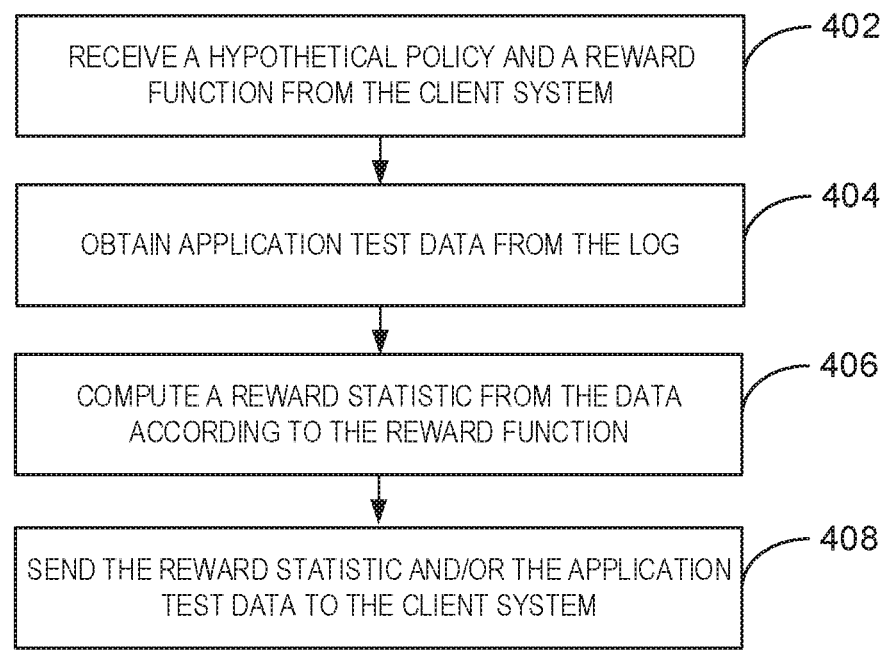
FIG. 4 is a process flow diagram summarizing a method of evaluating test data according to implementations described herein.

FIG. 4 is a process flow diagram summarizing a method of evaluating test data according to implementations described herein. One or more components of hardware or software of the computing device 800, may be configured to perform the method 400. In some implementations, various aspects of the method 400 may be performed in a cloud computing device. The method 400 may be performed by the application testing system and may begin at block 402.

At block 402, the application testing system receives a hypothetical policy and a reward function from the client system. The hypothetical policy can be a mapping of context information to specified actions that could be implemented by the AUT that the client is testing.

At block 404, the application testing service obtains relevant data from a log of application test data. The data obtained from the log can include all of those log entries whose context information matches a context value of the hypothetical policy.

At block 406, a reward statistic is computed using the data obtained from the application testing log. In some examples, block 406 may include computing two or more reward statistics. In some examples, no reward statistic is computed and block 406 is skipped.

At block 408, test results are returned to the client system. Sending test results may include sending the reward statistics computed at block 406, sending the application test data obtained from the application test log, or some combination thereof.

Figure 5:
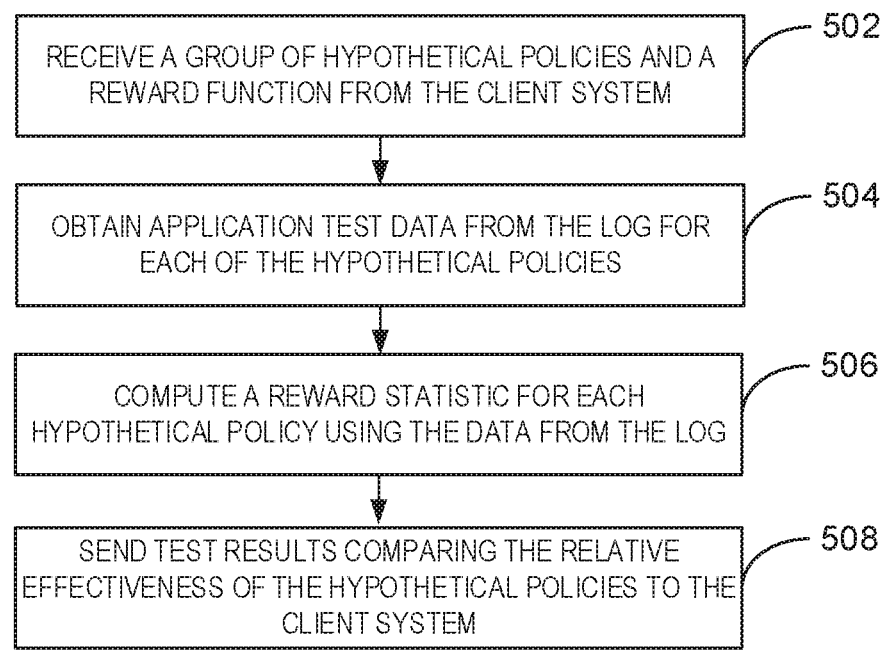
FIG. 5 is a process flow diagram summarizing another method of evaluating test data according to implementations described herein.

FIG. 5 is a process flow diagram summarizing another method of evaluating test data according to implementations described herein. One or more components of hardware or software of the computing device 800, may be configured to perform the method 500. In some implementations, various aspects of the method 500 may be performed in a cloud computing device. The method 500 may be performed by the application testing system and may begin at block 502.

At block 502, the application testing system receives a group of hypothetical policies from the client system. Each hypothetical policy can be a mapping of context information to specified actions that could be implemented by the AUT that the client is testing. The hypothetical policies may be created by the client and may be submitted to the application testing system to determine which policy or subset of policies will be more effective according to the test data that has been collected by the application testing system.

At block 504, the application testing service obtains relevant data from a log of application test data for each of the hypothetical policies. For each hypothetical policy, the data obtained from the log can include all of those log entries whose context information matches a context value of the hypothetical policy.

At block 506, a reward statistic is computed for each hypothetical policy using the data obtained from the application testing log. The reward statistic is computed according to the reward function received from the client. In some examples, block 406 may include computing two or more reward statistics. In some examples, no reward statistic is computed and block 406 is skipped.

At block 508, test results comparing the relative effectiveness of the hypothetical policies are returned to the client system. For example, the application testing service can identify one or more of the most effective policies of the hypothetical policies, rank the policies according to effectiveness, identify all of the hypothetical policies whose effectiveness exceeds a specified threshold, and the like. Sending test results may also include sending the reward statistics computed at block 506, sending the application test data obtained from the application test log, or some combination thereof.

Figure 6:
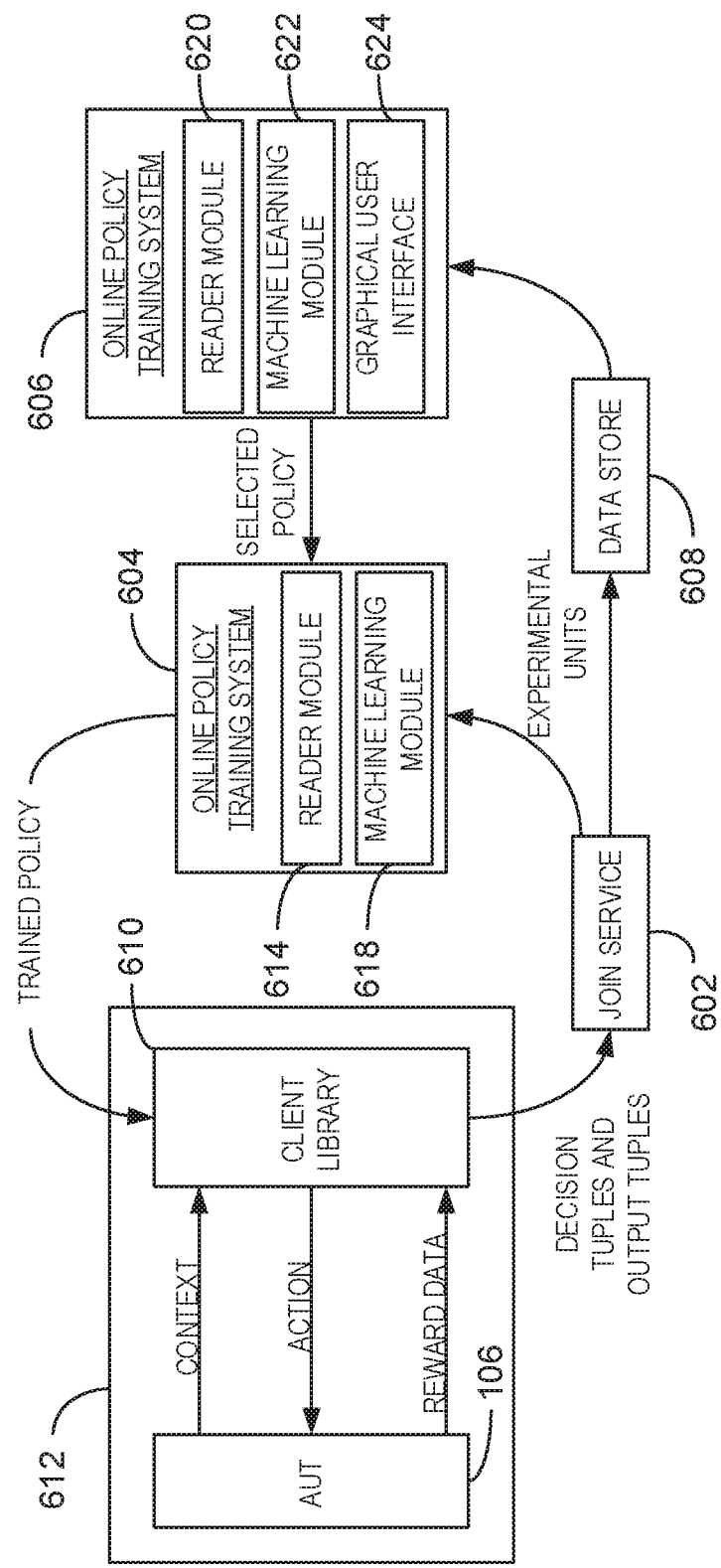
FIG. 6 is a block diagram of an example application testing system according to implementations described herein.

FIG. 6 is a block diagram of an example application testing system. The application testing system 600 includes a join service 602, an online policy training system 604, an offline policy training system 606, and a data store 608. The testing service 600 also includes a client library 610 that resides on the client system 612 and provides an interface between the AUT 106 and other components of the testing service. The client library interfaces with the AUT, makes decisions about policies to be implemented, performs exploration to identify improved policies, and issues logging requests to gather exploration data. The client library may be implemented as a Web API.

The Join Service 602 is responsible for joining and logging exploration data. The online policy training system 604 and the offline policy training 606 system perform policy learning, and trained policies are deployed back to the client library 610.

Each component of the testing system 600 may be configured to use a common format for all of the data being transmitted. As a consequence, each component can be used in isolation or replaced with customized implementations to suit the AUT's environment. For example, the client library 610 may be customized to support custom logging classes, which can send exploration data to an external system for logging and learning. Additionally, the join service 602 can be implemented by any key-value store that supports expiration timers. The online policy training system 604 can take data points generated by any external source, and can be implemented using any machine learning package that understands the data and satisfies the latency and throughput requirements of AUT 106.

The client library 610 implements various exploration policies which are used to gather data that can be analyzed to determine an optimal, or near optimal, policy to be implemented in a variety of circumstances. Each policy implemented will produce an item of exploration data referred to herein as an experimental unit. To implement a policy, the client library 610 receives context features (x) and a key (k) as input from the AUT, and sends an action (a) back to the AUT 107 as output. The key (k) uniquely identifies the experimental unit, and may also be referred to herein as the unit identifier (UnitID). Separately, a keyed tuple (k, (x, a, p, aux)), called the decision tuple, is transmitted from the client library 610 to the join service 602. Here, p is the probability of the chosen action according to the exploration policy, and aux is auxiliary information that can be used for policy learning and/or debugging. Later, a key (k) and an outcome fragment f (e.g., reward data) are sent from the AUT 106 to the client library 610, triggering a separate transmission of an output tuple (k, f) to the join service 602. An outcome can consist of multiple fragments, which might be observed at different times. Accordingly, multiple outcome tuples can be transmitted for a given experimental unit. The reward can be included explicitly as an outcome fragment, or can be computed afterwards. For example, the reward can be computed based on a plurality of outcome fragments after they are received.

Returning the action is time-sensitive for many applications, particularly when it delays the AUT's response to a user. Therefore, the action selection may be optimized for latency. However, communication with the join service 602 can be delayed (as long as the delay is much smaller than the desired learning latency). Therefore, communication with the join service 602 may be optimized for throughput. The client library 610 may be configured to allow a default policy to be selected and revised. In some embodiments, the default policy is revised periodically by pulling a new policy from the online policy training system 604 at a configurable rate. In some embodiments, the default policy can also be revised by allowing the client to manually select a specified policy as the default policy.

Randomization of actions occurs by seeding a pseudo-random number generator (PRNG) using the UnitID and also the application ID. In some embodiments, the PRNG is invoked once per experimental unit and is not reused across experimental units. Including the application ID in the seed ensures that the randomization from multiple uses of the application testing service in the same system (e.g., for different portions of a website) are not correlated.

The join service 602 collects exploration data and joins each decision tuple to the outcome tuples from the same experimental unit. The outcome tuples often arrive after a substantial delay from the decision tuple and from one another. The outcome tuples may also arrive from an entirely different component of the AUT 106. For example, the outcome tuples may be generated by the user's browser or by one of the news site's servers which process user clicks, among other possibilities. The join service 602 is parameterized by a join window, which describes a length of time to wait for the outcome tuples with a given UnitID after the first tuple has arrived.

The join service 602 receives the stream of key-value pairs and outputs a stream of joined tuples (value1, value2, . . . ), where values are joined if they share the same key (UnitID) and occur within the join window from the first appearance of this key. The joined tuples form the experimental unit which is then output to the online policy training system (via a queue for example), and also sent to data storage 608 to be later used for offline experimentation. The join service 602 may be implemented to span several machines in a data center and may be heavily optimized to a specific data center. The join service 602 may also be configured to be completely transparent to the rest of the testing system.

The online policy training system 604 performs policy training. Policy training refers to the process by which hypothetical policies are evaluated to identify the policy that approximately maximizes the estimated expected reward. The policy with the highest expected reward is identified as the trained policy, which may be selected as the default policy for the next policy training iteration. The online policy training system 604 quickly updates the trained policies to incorporate a stream of data points output by the join service 602. It can run continuously and adapt to changes in the workload received by the AUT 106 or the environment that the AUT 106 interacts with. Policies are re-trained and may be checkpointed (i.e., logged with a time stamp) at a configurable rate.

The online policy training system 604 can also be used to evaluate arbitrary policies in real time. To evaluate policy performance, performance of a default policy can be tracked to provide an expected reward for the default policy. Next, the trained policy can be evaluated on randomly chosen test data and an expected reward computed for the trained policy. The expected reward can be computed using inverse propensity scoring (IPS). Specifically, when a given data point is collected, the decision algorithm 200 takes a context and computes a distribution D over actions, then draws a sample from D. This D is also recorded in the log. For a specific policy P, we estimate its expected reward as the sum of the logged reward statistics for each matching data point divided by D(action), where a data point is matching if the action recorded in the log coincides with one chosen by the policy for a given context. These statistics can be used to implement performance safeguards and to display performance on a dashboard.

The online policy training system 604 can include a reader module 614 to process the incoming data stream, and a machine learning module 618 to actually perform policy training. The reader module 614 may also translate from the output format of the join service 602 to the input format of the machine learning module 618.

The offline policy training system 606 provides offline experimentation capability. For example, the offline policy training system 606 can provide the capability to evaluate a given policy or set of policies using stored data. The offline policy training system 606 can provide the capability to train new policies on a slower time scale compared to the online policy training system 604. The offline policy training system 606 also provides additional flexibility, such as the ability to changing the reward function, change the parameters of the machine learning algorithm, or specify a different machine learning algorithm, among others.

Improvements generated through offline experimentation can be integrated into the online loop by restarting the online policy training system 604 with the newly optimized policy or decision algorithm. Similar to the online policy training system 604, the offline policy training system 606 can include a reader module 620 which receives exploration data from data storage 608, and a machine learning module 622, which actually performs the policy training. The machine learning module 622 can be the same as the one in the online policy training system 604, or different. The offline policy training system 606 also includes a display and a Graphical User Interface (GUI) 624 to enable the client to interface with the offline policy training system 606. The display, such as a computer monitor, touch screen display, or other type of display device, may be included in or coupled to the offline policy training system 606. The GUI 624 may be configured to generate a dashboard on the display, as described below in relation to FIG. 7.

The machine learning modules 614 and 622 include algorithms for policy training and a system for running these algorithms at a sufficient scale. Any suitable machine learning system can be used, as long as it provides machine learning from exploration data and (for the online policy training system 604) supports sufficiently fast incremental updates. For example, the machine learning module may use decision trees, neural nets, and others.

Figure 7:
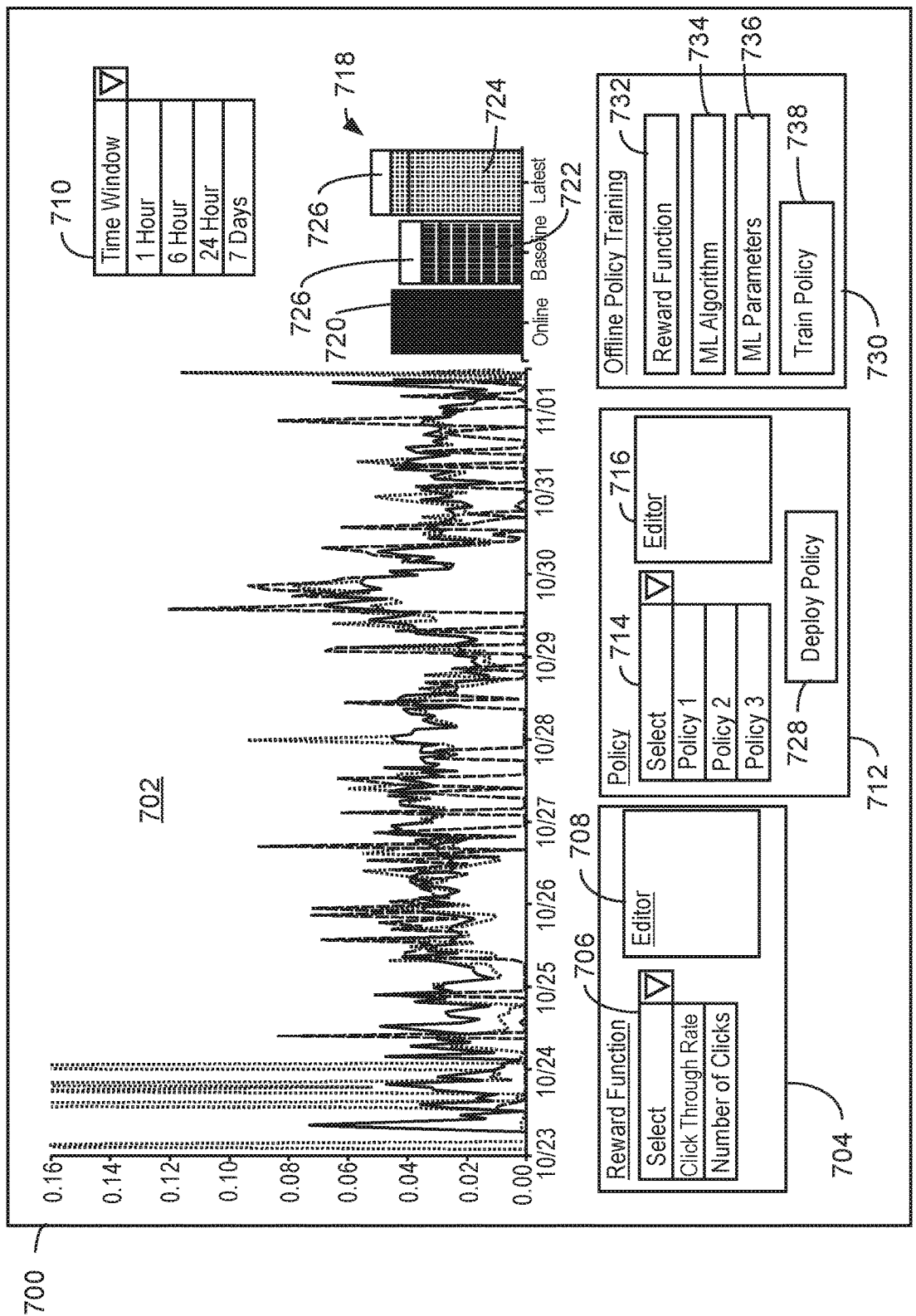
FIG. 7 is an example of a graphical user interface for enabling the client to evaluate hypothetical policies.

FIG. 7 is an example of a graphical user interface (GUI) for enabling the client to evaluate hypothetical policies. The GUI of FIG. 7 may also be referred to herein as a dashboard 700. The dashboard 700 provides a visual interface that enables the client to evaluate hypothetical policies in comparison with other policies that have been deployed or trained. The dashboard 700 includes a line graph 702 showing the performance results for several policies, referred to as the online policy, the baseline policy, the latest policy.

The online policy is a policy which has been previously deployed for the application under test. The performance results shown for the online policy is based on actual data gathered by the policy training system. The baseline policy is a hypothetical policy that has been trained by the online policy training system (FIG. 6). The latest policy is a policy manually selected or created by the client. The performance results for the baseline policy and the latest policy represent an expected performance, which is computed based on the previously gathered data exploration data.

The Y-axis of the line graph 702 represents the actual or expected reward for the respective policy. The dashboard 700 includes a reward function tool 704 that allows the client to select specify the reward. In some embodiments, the reward function tool may include a reward function drop-down box 706 that enables the client to select a predefined reward function, and/or a reward function editor 708 that enables the user to generate a custom reward function.

The X-axis of the line graph 702 represents time. The line graph 702 shows the reward plotted over any suitable time a time window, which may be selected by the user. The dashboard includes a time window selection tool 710, which may be a drop down box that provides the user with several possible time window selections.

The dashboard 700 also includes a policy selection tool 712 that can be used by the client to select the latest policy. In some embodiments, the policy selection tool may include a policy dropdown box 714 that enables the client to select a predefined policy, which may be previously trained policy, a previously implemented policy, among others. The policy selection tool may include a policy editor 716 that enables the user to generate a custom policy.

In some embodiments, the dashboard 700 also includes a bar graph. The bar graph 718 includes a first bar 720 corresponding to the online policy, a second bar 722 corresponding to the baseline policy, and a third bar 724 corresponding to the latest policy. The height of each bar represents the respective reward averaged over the selected time window. Each bar may also be configured as a selection tool such that clicking on a bar will toggle the respective policies to be displayed or hidden in the line graph.

The second bar 722 representing the baseline policy and the third bar 724 representing the latest policy can also include confidence bars 726, which represent the confidence band associated with respective reward value. The confidence band represents the uncertainty in the estimated reward values.

In some embodiments, the dashboard 700 includes a selection tool such as deploy button 728 that enables the client to deploy the latest policy. Selecting the deploy button 728 causes the policy selected by the client to be sent to the online policy training system (FIG. 6), which sends the selected policy to the client library for deployment.

The dashboard 700 also includes a policy training tool 730 that can be used to train additional policies offline using the offline policy training system 606. The policy training tool 730 may include a number of input tools that enable the client to specify the parameters to be used to train the new policy. For example, the policy training tool 730 can include a reward function input tool 732 that enables the client to specify the reward function, a machine learning algorithm tool 734 that enables the client to specify the type of machine learning algorithm to be used, and a machine learning parameter tool 736 that enables the user to set various parameters of the machine learning algorithm. The parameters specified by the client may be communicated to the offline policy training system 606. The train policy button 738 instructs the offline policy training system 606 to begin training the new policy using the selected parameters. Once the new policy is trained, the policy may be added as a new choice in the policy dropdown box 714.

FIG. 8 is intended to provide a brief, general description of a computing architecture in which the various techniques described herein may be implemented. For example, a method and system for testing an application can be implemented in such a computing environment. While the claimed subject matter has been described above in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types.

FIG. 8 is a block diagram of an exemplary computing device configured for implementing various aspects of the techniques described herein. The computing device 800 is an example of a computing device that can be used to implement any of the techniques described above. For example, the exemplary computing device 800 may be one computing device in a group of commuting devices configured as a cloud computing platform. The exemplary computing device 800 includes a computer 802. The computer 802 includes a processing unit 804, a system memory 806, and a system bus 808.

The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure, including the memory bus or memory controller, a peripheral bus or external bus, and a local bus using any variety of available bus architectures known to those of ordinary skill in the art. The system memory 806 includes computer-readable storage media that includes volatile memory 810 and nonvolatile memory 812.

The basic input/output system (BIOS), containing the basic routines to transfer information between elements within the computer 802, such as during start-up, is stored in nonvolatile memory 812. By way of illustration, and not limitation, nonvolatile memory 812 can include read only memory (ROM), programmable ROM (PROM), electrically programmable ROM (EPROM), electrically erasable programmable ROM (EEPROM), or flash memory.

Volatile memory 810 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 802 also includes other computer-readable media, such as removable/non-removable, volatile/non-volatile computer storage media. FIG. 8 shows, for example a disk storage 814. Disk storage 814 includes, but is not limited to, devices like a magnetic disk drive, floppy disk drive, tape drive, Jaz drive, Zip drive, LS-210 drive, flash memory card, or memory stick.

In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used such as interface 816.

It is to be appreciated that FIG. 8 describes software that acts as an intermediary between users and the basic computer resources described in the suitable computing device 800. Such software includes an operating system 818. Operating system 818, which can be stored on disk storage 814, acts to control and allocate resources of the computer system 802.

System applications 820 take advantage of the management of resources by operating system 818 through program modules 822 and program data 824 stored either in system memory 806 or on disk storage 814. It is to be appreciated that the claimed subject matter can be implemented with various operating systems or combinations of operating systems.

A user enters commands or information into the computer 802 through input devices 826. Input devices 826 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 826 connect to the processing unit 804 through the system bus 808 via interface ports 828. Interface ports 828 include, for example, a serial port, a parallel port, a game port, and a universal serial bus (USB).

Output devices 830 use some of the same type of ports as input devices 826. Thus, for example, a USB port may be used to provide input to the computer 802, and to output information from computer 802 to an output device 830.

Output adapter 832 is provided to illustrate that there are some output devices 830 like monitors, speakers, and printers, among other output devices 830, which are accessible via adapters. The output adapters 832 include, by way of illustration and not limitation, video and sound cards that provide a means of connection between the output device 830 and the system bus 808. It can be noted that other devices and systems of devices provide both input and output capabilities such as remote computers 834.

The computer 802 can be a server hosting various software applications in a networked environment using logical connections to one or more remote computers, such as remote computers 834. The remote computers 834 may be client systems configured with web browsers, PC applications, mobile phone applications, and the like.

The remote computers 834 can be a personal computer, a server, a router, a network PC, a workstation, a microprocessor based appliance, a mobile phone, a peer device or other common network node and the like, and typically includes many or all of the elements described relative to the computer 802.

For purposes of brevity, a memory storage device 836 is illustrated with remote computers 834. Remote computers 834 is logically connected to the computer 802 through a network interface 838 and then connected via a wireless communication connection 840.

Network interface 838 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connections 840 refers to the hardware/software employed to connect the network interface 838 to the bus 808. While communication connection 840 is shown for illustrative clarity inside computer 802, it can also be external to the computer 802. The hardware/software for connection to the network interface 638 may include, for exemplary purposes, internal and external technologies such as, mobile phone switches, modems including regular telephone grade modems, cable modems and DSL modems, ISDN adapters, and Ethernet cards.

An exemplary processing unit 604 for the server may be a computing cluster. The disk storage 614 may comprise an enterprise data storage system, for example, holding thousands of impressions.

EXAMPLES

Example 1

An example of a method for displaying performance data for computer implemented decision policies is provided. The example method includes displaying a first reward statistic comprising an actual performance result for a policy implemented by an application. The example method also includes obtaining experimental data corresponding to previously implemented policies, computing a second reward statistic for a hypothetical policy using a reward function applied to the experimental data. The example method also includes displaying the second reward statistic together with the first reward statistic to enable a user to compare the first reward statistic and the second first reward statistic.

In some implementations, the hypothetical policy can be selected by the user from a list of predefined hypothetical policies or manually generated by the user, and the reward function may also be selected by the user from a list of predefined reward functions, or manually generated by the user. In some implementations, the method includes computing a third reward statistic for a baseline policy from the experimental data, and displaying the third reward statistic together with the first reward statistic and the second reward statistic. The baseline policy may be generated by a machine learning algorithm. Displaying the first reward statistic and second reward statistic can include displaying line graphs representing the reward statistics plotted over a specified time window, or a bar graph representing the reward statistics averaged over a specified time window, among others. In some implementations, the method can also include receiving a command from the user to deploy the hypothetical policy for the application.

Example 2

An example of a system for evaluating computer implemented decision policies is provided. The example system includes a display device, a processor, and a system memory that stores code to direct the actions of the processor. The code directs the processor to display, on the display device, a first reward statistic comprising an actual performance result for a policy implemented by an application. The code also directs the processor to obtain experimental data corresponding to previously implemented policies, and compute a second reward statistic for a hypothetical policy using a reward function applied to the experimental data. The code also directs the processor to display, on the display device, the second reward statistic together with the first reward statistic to enable a user to compare the first reward statistic and the second first reward statistic.

In some implementations, the hypothetical policy can be selected by the user from a list of predefined hypothetical policies or manually generated by the user, and the reward function may also be selected by the user from a list of predefined reward functions, or manually generated by the user. In some implementations, the system includes code to direct the processor to compute a third reward statistic for a baseline policy from the experimental data, and display, on the display device, the third reward statistic together with the first reward statistic and the second reward statistic. The baseline policy may be generated by a machine learning algorithm. Displaying the first reward statistic and second reward statistic can include displaying line graphs representing the reward statistics plotted over a specified time window, or a bar graph representing the reward statistics averaged over a specified time window, among others. In some implementations, the system memory includes code that can direct the processor to generate an interface tool for receiving a command from the user to deploy the hypothetical policy for the application. In some implementations, the system memory includes code that can direct the processor to generate an interface tool for receiving a selection of a time window from the user, wherein the time window determines a length of time over which the first reward statistic and second reward statistic are computed and displayed.

Example 3

An example of a computer-readable memory storage device for storing computer-readable instructions is provided. When executed, the computer-readable instructions instruct one or more processing devices to display a first reward statistic comprising an actual performance result for a policy implemented by an application. The computer-readable instructions also instruct the processing devices to obtain experimental data corresponding to previously implemented policies, and compute a second reward statistic for a hypothetical policy using a reward function applied to the experimental data. The computer-readable instructions also instruct the processing devices to display the second reward statistic together with the first reward statistic to enable a user to compare the first reward statistic and the second first reward statistic.

In some implementations, the hypothetical policy can be selected by the user from a list of predefined hypothetical policies or manually generated by the user, and the reward function may also be selected by the user from a list of predefined reward functions, or manually generated by the user. In some implementations, the computer-readable instructions also instruct the processing devices to compute a third reward statistic for a baseline policy from the experimental data, and display, on the display device, the third reward statistic together with the first reward statistic and the second reward statistic. The baseline policy may be generated by a machine learning algorithm. Displaying the first reward statistic and second reward statistic can include displaying line graphs representing the reward statistics plotted over a specified time window, or a bar graph representing the reward statistics averaged over a specified time window, among others. In some implementations, the computer-readable instructions also instruct the processing devices to deploy the hypothetical policy to the application in response to a command received from the user.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method of displaying performance data for computer implemented decision policies, comprising:
   displaying a first reward statistic comprising an actual performance result for a policy implemented by an application;
   obtaining experimental data corresponding to previously implemented policies, wherein the experimental data comprises reward data and corresponding context information received from the application for each one of a plurality of human users, wherein the context information describes demographic information about each of the human users and the reward data describes details about each human user's interaction with the application in response to a customization applied pursuant to the previously implemented policies;

generating a hypothetical policy by a policy training system that enables a client to specify policy training parameters to be used by the policy training system to train the hypothetical policy on the experimental data, wherein the hypothetical policy comprises a mapping of context values to specified actions;

identifying a subset of experimental data from the experimental data, wherein the subset of experimental data comprises entries in the experimental data whose context information matches a context value of the hypothetical policy;

computing a second reward statistic for the hypothetical policy using a reward function applied to the subset of experimental data; and displaying the second reward statistic together with the first reward statistic to enable the client to compare the first reward statistic and the second reward statistic, wherein the displaying of the first reward statistic and the second reward statistic indicates which of the corresponding policies is likely to provide a better user experience when using the application.

2. The method of claim 1, wherein the hypothetical policy is generated by a machine learning algorithm based on the policy training parameters specified by the client.

3. The method of claim 1, wherein the hypothetical policy is selected by the client from a list of predefined hypothetical policies.

4. The method of claim 1, wherein the reward function is selected by the client from a list of predefined reward functions.

5. The method of claim 1, wherein the reward function is manually generated by the client.

6. The method of claim 1, comprising:
computing a third reward statistic for a baseline policy from the experimental data, wherein the baseline policy is generated by a machine learning algorithm; and
displaying the third reward statistic together with the first reward statistic and the second reward statistic.

7. The method of claim 1, wherein displaying the first reward statistic and second reward statistic comprises displaying line graphs representing the reward statistics plotted over a specified time window.

8. The method of claim 1, wherein displaying the first reward statistic and second reward statistic comprises displaying a bar graph representing the reward statistics averaged over a specified time window.

9. The method of claim 1, comprising generating a selection tool that is selectable by the client to deploy the hypothetical policy for the application.

10. A system for evaluating computer implemented decision policies, comprising:
a display device;
a processor; and
a system memory comprising code to direct the processor to:
display, on the display device, a first reward statistic comprising an actual performance result for a policy implemented by an application;
obtain experimental data corresponding to previously implemented policies, wherein the experimental data comprises reward data and corresponding context information received from the application for each one of a plurality of human users, wherein the context information describes demographic information about each of the human users and the reward data describes details about each human user's interaction with the application in response to a customization applied pursuant to the previously implemented policies;
generate a hypothetical policy by a policy training system that enables a client to specify policy training parameters to be used by the policy training system to train the hypothetical policy on the experimental data, wherein the hypothetical policy comprises a mapping of context values to specified actions;
identify a subset of experimental data from the experimental data, wherein the subset of experimental data comprises entries in the experimental data whose context information matches a context value of the hypothetical policy;
compute a second reward statistic for the hypothetical policy using a reward function applied to the subset of experimental data; and
display, on the display device, the second reward statistic together with the first reward statistic to enable the client to compare the first reward statistic and the second reward statistic, wherein the displaying of the first reward statistic and the second reward statistic indicates which of the corresponding policies is likely to provide a better user experience when using the application.

11. The system of claim 10, wherein the hypothetical policy is generated by a machine learning algorithm based on the policy training parameters specified by the client.

12. The system of claim 10, comprising code to direct the processor to:
compute a third reward statistic for a baseline policy from the experimental data, wherein the baseline policy is generated by a machine learning algorithm; and
display, on the display device, the third reward statistic together with the first reward statistic and the second reward statistic.

13. The system of claim 10, wherein displaying the first reward statistic and second reward statistic comprises displaying line graphs representing of the reward statistics plotted over a specified time window.

14. The system of claim 10, wherein displaying the first reward statistic and second reward statistic comprises displaying a bar graph representing the reward statistics averaged over a specified time window.

15. The system of claim 10, comprising code to direct the processor to generate an interface tool for receiving a command from the client to deploy the hypothetical policy for the application.

16. The system of claim 10, comprising code to direct the processor to generate an interface tool for receiving a selection of a time window from the client, wherein the time window determines a length of time over which the first reward statistic and second reward statistic are computed and displayed.

17. One or more computer-readable memory storage devices for storing computer-readable instructions that, when executed, instruct one or more processing devices to:
display a first reward statistic comprising an actual performance result for a policy implemented by an application;
obtain experimental data corresponding to previously implemented policies, wherein the experimental data comprises reward data and corresponding context information received from the application for each one of a plurality of human users, wherein the context information describes demographic information about each of the human users and the reward data describes details about each human user's interaction with the application in response to a customization applied pursuant to the previously implemented policies;

generate a policy training tool that enables a client to specify policy training parameters to be used to train a hypothetical policy;

generate the hypothetical policy based on the policy training parameters specified by the client, wherein the hypothetical policy comprises a mapping of context values to specified actions;

identify a subset of experimental data from the experimental data, wherein the subset of experimental data comprises entries in the experimental data whose context information matches a context value of the hypothetical policy;

compute a second reward statistic for the hypothetical policy using a reward function applied to the subset of experimental data; and display the second reward statistic together with the first reward statistic to enable the client to compare the first reward statistic and the second reward statistic.

18. The method of claim 17, wherein the hypothetical policy is generated by a machine learning algorithm based on the policy training parameters specified by the client.

19. The computer-readable memory storage devices of claim 17, comprising computer-readable instructions that, when executed, instruct one or more processing devices to:

compute a third reward statistic for a baseline policy from the experimental data, wherein the baseline policy is generated by a machine learning algorithm; and display, on the display device, the third reward statistic together with the first reward statistic and the second reward statistic.

20. The computer-readable memory storage devices of claim 17, wherein the computer-readable instructions that instruct the one or more processing devices to display the first reward statistic and second reward statistic generate line graphs representing the reward statistics plotted over a specified time window.

21. The computer-readable memory storage devices of claim 17, wherein the computer-readable instructions that instruct the one or more processing devices to display the first reward statistic and second reward statistic generate bar graphs representing the reward statistics averaged over a specified time window.

22. The computer-readable memory storage devices of claim 17, comprising computer-readable instructions that, when executed, instruct one or more processing devices to deploy the hypothetical policy to the application in response to a command received from the client.

* * * * *